US008845201B2

(12) United States Patent
Creek et al.

(10) Patent No.: US 8,845,201 B2

(45) Date of Patent: Sep. 30, 2014

(54) BEARING WITH SEALING SLINGER

(75) Inventors: Steven W. Creek, Shelby Township, MI (US); Edralin S. Diaz, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 18 days.

(21) Appl. No.: 13/567,149

(22) Filed: Aug. 6, 2012

(65) Prior Publication Data

US 2014/0037238 A1 Feb. 6, 2014

(51) Int. Cl.

*F16C 33/78* (2006.01)

*F16C 33/76* (2006.01)

(52) U.S. Cl.

CPC ............... *F16C 33/784* (2013.01); *F16C 33/76* (2013.01)

USPC .......................................... 384/478; 384/477

(58) Field of Classification Search

USPC ......... 384/477–478, 480–482, 484, 488, 607, 384/610; 277/346, 402, 423; 464/117, 175, 464/178

See application file for complete search history.

(56) References Cited

U.S. PATENT DOCUMENTS 2,716,580 A * 8/1955 De Pagter .................... 384/530
2,856,208 A * 10/1958 Cobb ........................... 277/402
2,897,023 A * 7/1959 Burkhalter et al. ........... 384/536
3,350,148 A * 10/1967 Sanguinetti et al. .......... 384/488
4,277,114 A * 7/1981 Lindegger ..................... 384/480
6,206,380 B1 * 3/2001 Miyazaki ...................... 277/551
6,234,293 B1 * 5/2001 Fasoli ............................ 193/37
6,264,578 B1 * 7/2001 Ayukawa ...................... 474/135
6,422,947 B1 * 7/2002 Kelly et al. .................. 464/182
6,655,208 B1 * 12/2003 McClanahan .................. 73/462
7,021,830 B2 * 4/2006 Takehara et al. ............. 384/486
7,338,384 B2 * 3/2008 Patrascu et al. .............. 464/175
2008/0293502 A1 11/2008 Oinuma et al.
2009/0191999 A1 * 7/2009 Joseph et al. ................. 384/485
2010/0292015 A1 * 11/2010 Sanchez et al. ............... 464/117
2011/0075958 A1 * 3/2011 Yamaguchi et al. .......... 384/484
2012/0275739 A1 * 11/2012 Couillard ...................... 384/515

FOREIGN PATENT DOCUMENTS

CA 2313422 C * 9/2004
GB 1408706 A * 10/1975
JP 08247155 A * 9/1996 ............. F16C 33/76
JP 2010242853 A * 10/2010

* cited by examiner

*Primary Examiner* — Marcus Charles

(74) *Attorney, Agent, or Firm* — Quinn Law Group, PLLC

(57) ABSTRACT

A bearing includes an inner race and an outer race, which is radially outward from the inner race relative to a bearing axis. A cylindrical sleeve is substantially coaxial with the bearing axis and contacts an outer surface of the inner race. A dust shield is substantially perpendicular to the cylindrical sleeve, and a primary seal is axially interior to the dust shield. The primary seal contacts the cylindrical sleeve and the outer race.

11 Claims, 3 Drawing Sheets

BEARING WITH SEALING SLINGER

TECHNICAL FIELD

This disclosure relates to bearings, and particularly to exposed bearings.

BACKGROUND

Bearings constrain the relative motion between two or more parts to only desired types of motion. Rolling-element bearings carry a load by placing round or conical elements between the two parts or pieces. The relative motion of the pieces causes the round elements to roll, which may reduce or limit rolling resistance between the two pieces.

SUMMARY

A bearing, such as may be used to support a rotating shaft, is provided. The bearing includes an inner race and an outer race, which is radially outward from the inner race relative to a bearing axis.

A cylindrical sleeve is substantially coaxial with the bearing axis. The cylindrical sleeve contacts an outer surface of the inner race. A dust shield is substantially perpendicular to the cylindrical sleeve. The bearing also includes a primary seal, which is axially interior to the dust shield. The primary seal contacts the cylindrical sleeve and the outer race.

The above features and advantages, and other features and advantages, of the present invention are readily apparent from the following detailed description of some of the best modes and other embodiments for carrying out the invention, which is defined solely by the appended claims, when taken in connection with the accompanying drawings.

DETAILED DESCRIPTION

Figure 1:
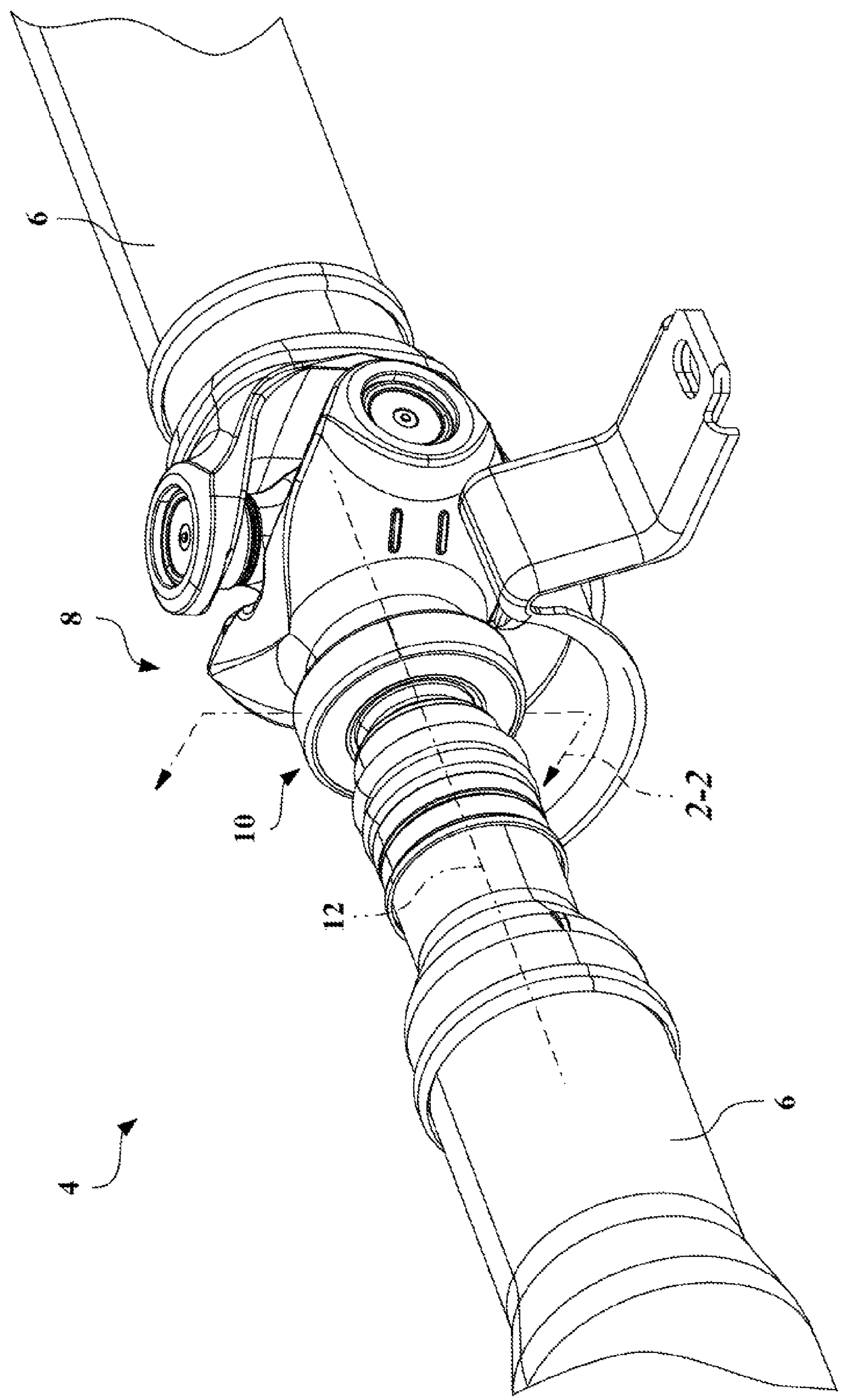
FIG. 1 is a schematic, isometric view of a center bearing assembly.

Referring to the drawings, like reference numbers correspond to like or similar components wherever possible throughout the several figures. FIG. 1 shows an isometric view of a center bearing assembly 4 for a vehicle (not shown). The center bearing assembly 4 may be supportive of a shaft 6, which may be a portion of a propeller shaft (propshaft) or another exposed, rotating shaft. A housing 8 supports a bearing 10 relative to the vehicle. The bearing 10 allows the shaft 6 to rotate relative to the housing 8 and the vehicle.

The bearing 10 rotates about a bearing axis 12, which is substantially coaxial with the shaft 6 and represents a longitudinal axis in cylindrical coordinate systems. In some vehicles, multiple bearings 10 may be used to facilitate rotation of more than two shafts 6.

While the present invention may be described with respect to automotive or vehicular applications, those skilled in the art will recognize the broader applicability of the invention. Those having ordinary skill in the art will recognize that terms such as “above,” “below,” “upward,” “downward,” et cetera, are used descriptively of the figures, and do not represent limitations on the scope of the invention, as defined by the appended claims. Any numerical designations, such as “first” or “second” are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description.

Figure 2:
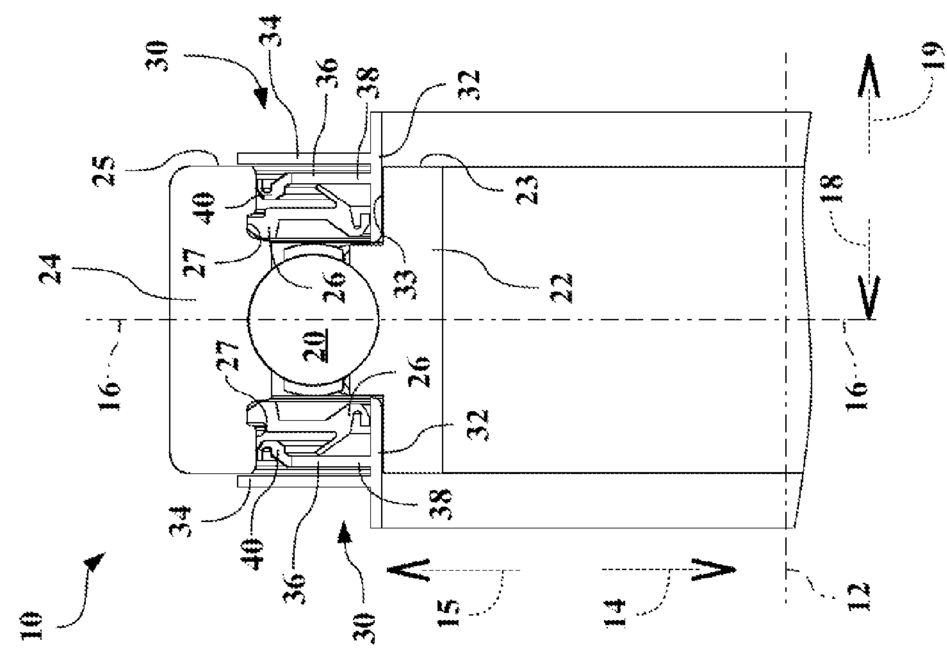
FIG. 2 is a schematic, cutaway view of a bearing from the center bearing assembly, taken along line 2-2 of FIG. 1.

Referring now to FIG. 2, and with continued reference to FIG. 1, there is shown a cutaway view of the bearing 10, taken generally along a line 2-2 of FIG. 1. FIG. 2 schematically illustrates a portion of one configuration of the bearing 10, and some of the materials and structures may be changed from those shown in the figure.

To assist description of the bearing 10, FIG. 2 shows several reference directions and features relative to the bearing 10. An inner direction 14 represents inward movement or elements toward the axis 12, and an outer direction 15 represents outward movement or elements away from the axis 12, along a radial direction in cylindrical coordinate systems. Alternatively stated, movement or relative position along the inner direction 14 is proximal to the axis 12 and movement or relative position along the outer direction 15 is distal to the axis 12.

The location of the axis 12 may not be shown to scale in FIG. 2. The axis 12 is generally perpendicular to the arrows illustrating the inner direction 14 and the outer direction 15.

A center plane 16, shown as a line in FIG. 2, bisects the bearing 10, which is symmetric about the center plane 16. However, the bearing 10 is not required to be symmetric. Furthermore, the housing 8—or casing or other support structure—surrounding the bearing 10 may be asymmetric or symmetric, regardless of the symmetry of the bearing 10. Because the bearing 10 shown is symmetric, it may be installed into the housing 8 in either direction.

An interior direction 18 represents movement or elements toward the center plane 16, and an exterior direction 19 represents movement or elements away from the center plane 16. The interior direction 18 and exterior direction 19 are substantially parallel to the axis 12. Alternatively stated, movement or relative position in the interior direction 18 is proximal to the center plane 16 and movement or relative position in the exterior direction 19 is distal to the center plane 16.

The bearing 10 includes one or more ball bearings 20, which also be referred to as balls. The ball bearings 20 carry the rotation and bear the friction caused by relative rotation between the shaft 6 and the housing 8. Alternatively, the bearing 10 may have pins or other friction carriers. The interior direction 18 points toward the ball bearings 20. The center plane 16 is substantially aligned with the ball bearing 20, but the center plane 16 may also align with, or bisect, one or more sets of pins. The bearing 10 may or may not be configured as a thrust bearing, in which case the bearing 10 carries axial loads.

An inner race 22 of the bearing 10 is in contact with, and generally rotates in common with, the shaft 6 (not shown in FIG. 2). The inner race 22 is distal from the shaft 6, relative to the axis 12. The inner race 22 defines an exterior surface 23, which is distal to the center plane 16 and is the same on both sides when the bearing 10 is symmetric. Note that the bearing 10 is not required to be symmetric, and any of the features, elements, and limitations described herein may be on only one side of the bearing 10.

An outer race 24 is radially outward from the inner race 22 relative to the axis 12. The outer race 24 defines an exterior surface 25, which is distal to the center plane 16 and is the same on both sides when the bearing 10 is symmetric. The inner race 22 and the outer race 24 are substantially coaxial with, and rotatable about, the axis 12.

In the bearing 10 shown, there are no corresponding interior surfaces of the inner race 22 and the outer race 24. However, the bearing 10 may be a split-race bearing, such that the inner race 22 or the outer race 24 is formed from two separate pieces. In the split-race bearing, there are interior surfaces on the inner race 22 or the outer race 24.

The ball bearings 20 roll between the inner race 22 and the outer race 24, although there may be intermediary components, such as friction-reducing linings. Grease or other lubricating media may coat the ball bearings 20 and the interfaces with the inner race 22 and the outer race 24.

At least one primary seal 26 substantially spans the gap between the inner race 22 and the outer race 24. The primary seal 26—or primary seals 26, as shown in FIG. 2—prevents ingress of, for example, dust, debris, or moisture to the ball bearings 20. The primary seal 26 may include features to increase the path distance required for foreign material to move from the exterior to the interior of the primary seal 26, and may be formed from rubber or another suitable material.

The bearing 10 includes at least one integrated sealing slinger 30. In the configuration shown, there are two integrated sealing slingers 30, which are substantially mirrored components and the bearing 10 shown is symmetric. However, note that the bearing 10 may have only one integrated sealing slinger 30, which may be on either side of the bearing 10 (left or right, as viewed in the figures).

Figure 3:
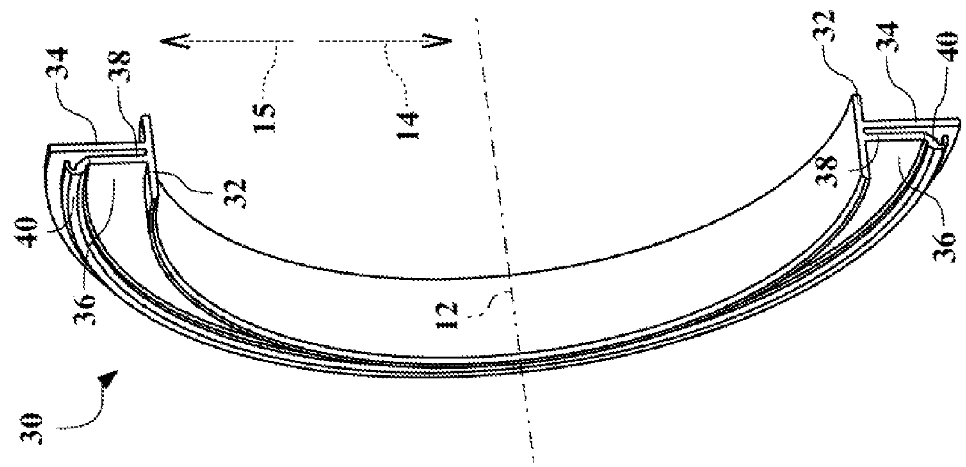
FIG. 3 is a schematic, isometric, cutaway view of a sealing slinger from the bearing shown in FIG. 2.

Referring also to FIG. 3, and with continued reference to FIGS. 1 and 2, there is shown another cutaway view of the integrated sealing slinger 30, taken along the line 2-2 of FIG. 1. The integrated sealing slinger 30 includes a cylindrical sleeve 32 that is substantially coaxial with the bearing axis 12. In the configuration shown, the cylindrical sleeve 32 contacts or sits against an outer surface 33 of the inner race 22 which is distal to the axis 12. The cylindrical sleeve 32 may be mated to the inner race 22 through a press or interference fit, or may be adhered or welded to the inner race 22.

The integrated sealing slinger 30 has a dust shield 34, which is substantially perpendicular to the cylindrical sleeve 32. The dust shield 34 shown is axially exterior to the outer race 24, such that the dust shield is distal to the exterior surface 25 relative to the center plane 16. In the integrated sealing slinger 30, a portion of the cylindrical sleeve 32 also extends axially beyond the dust shield 34.

In an alternative configuration, the cylindrical sleeve 32 may instead be mated to the outer race 24. In such a configuration, the components of the integrated sealing slinger 30 would reverse relative to the inner race 22 and the outer race 24. Therefore, the dust shield 34 would extend proximally from the outer race 24 toward the inner race 22, and the primary seal 26 would contact the inner race 22 and the cylindrical sleeve 32.

In the configuration shown in FIG. 2, the primary seal 26 is axially interior to the dust shield 34—such that it is between the dust shield 34 and the center plane 16 or is proximal to the center plane 16 relative to the dust shield 34. The primary seal 26 contacts both the cylindrical sleeve 32 and an inner surface 27 of the outer race 24.

In the configuration shown, the primary seal 26 may rotate substantially with the outer race 24. As the bearing 10 rotates, there is movement between the primary seal 26 and the cylindrical sleeve 32, such that the cylindrical sleeve 32 provides a sealing surface for the primary seal 26. The cylindrical sleeve 32 may be formed from stainless steel, which may improve the contact characteristics between the primary seal 26 and the cylindrical sleeve 32 and extend the effective life of the primary seal 26.

The integrated sealing slinger 30 shown in FIGS. 2 and 3 also has a secondary seal 36, which is located between the primary seal 26 and the dust shield 34. The secondary seal 36 is proximal to the center plane 16 relative to the dust shield 34. The secondary seal 36, in addition to the dust shield 34 and the primary seal 26, provides further protection against ingress of foreign matter into the interior of the bearing 10.

The secondary seal 36 includes a seal body 38 and a sealing member 40. The seal body 38 extends radially outward from the cylindrical sleeve 32, and may be formed from stainless steel or another suitable material. The sealing member 40 is radially outward, or distal to, from the seal body 38, and may be formed from rubber or another suitable material. The sealing member 40 contacts the inner surface 27 of the outer race 24.

The sealing member 40 may be formed such that it is mated with the seal body 38 without further attachment. For example, and without limitation, a portion of the seal body 38 may be captured or surrounded by the sealing member 40, and the sealing member 40 may be injection-molded onto, or into, an outer portion of the seal body 38.

As shown in FIGS. 2 and 3, the cylindrical sleeve 32 and the dust shield 34 of the integrated sealing slinger 30 may be formed as a one-piece, unitary body. One-piece components are formed together without subsequent attachment of any sort, and have continuous, and generally uniform, structure. For example, castings are one-piece unitary bodies. Components machined from a single billet are also one-piece, unitary bodies.

Furthermore, in the configuration shown in FIG. 3, the seal body 38, the cylindrical sleeve 32, and the dust shield 34 of the integrated sealing slinger 30 are all formed as a one-piece, unitary body. Therefore, only the sealing member 40 is not part of the one-piece, unitary body in the integrated sealing slinger 30 shown.

However, in other configurations of the bearing 10 and the integrated sealing slinger 30, the seal body 38 may be separately formed and subsequently attached to the cylindrical sleeve 32. The seal body 38 may be attached by, for example and without limitation, press fitting, welding, or adhesively fastening the seal body 38 to the cylindrical sleeve 32.

Figure 4:
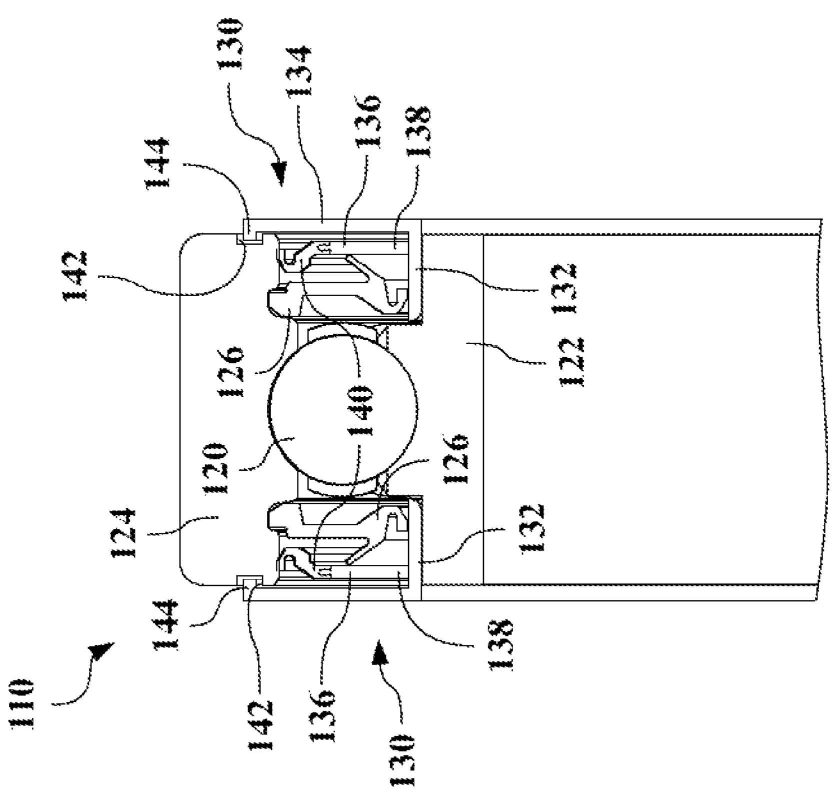
FIG. 4 is a schematic, cutaway view of another bearing configuration, taken along a line similar to the line 2-2 of FIG. 1.

Referring now to FIG. 4, and with continued reference to FIGS. 1-3, there is shown a schematic, cutaway view of a bearing 110, which may be used in a manner similar to the bearing 10 shown in FIG. 2. FIG. 4 is taken from a similar viewpoint to FIG. 2, and the bearing 110 may be used with the shaft 6 and housing 8 or similar components. Directional and geometric references may be used interchangeably between FIGS. 2 and 4. Some features of the bearing 110 shown in FIG. 4 may not be separately numbered but correspond to features shown and discussed in relation to FIGS. 1-3.

In the bearing 110, one or more ball bearings 120 ride between an inner race 122 and an outer race 124, which is radially outward from the inner race 122 relative to an axis (not shown) of the bearing 110. A primary seal 126 is also disposed between the inner race 122 and the outer race 124, and acts to restrict passage of dust, debris, and moisture from the exterior of the bearing 110 to the ball bearings 120.

An integrated sealing slinger 130 is disposed on both sides of the bearing 110. The integrated sealing slinger 130 includes a cylindrical sleeve 132, which is substantially coaxial with the bearing axis (not shown) and contacts an outer surface of the inner race 122, such that the cylindrical sleeve 132 is distal to the inner race 122 relative to the axis. The primary seal 126 rides between the cylindrical sleeve 132 and the outer race 124.

A dust shield 134 is substantially perpendicular to the cylindrical sleeve 132, and is axially exterior to the outer race 124. The dust shield 134 is the exterior element of the integrated sealing slinger 130 and acts as a barrier to entrance of dust and debris into the bearing 110. The dust shield 134 is also axially exterior to the outer race 124.

A secondary seal 136 is intermediate the primary seal 126 and the dust shield 134. The secondary seal 136 includes a seal body 138 extending radially outward from the cylindrical sleeve 132, and a sealing member 140 radially outward from the seal body 138. The sealing member 140 may be formed from rubber or another suitable material, and contacts an inner surface of the outer race 124.

In the integrated sealing slinger 30 shown in FIGS. 2 and 3, the seal body 38 was formed as a one-piece unitary body with the cylindrical sleeve 32. However, in the integrated sealing slinger 130, the seal body 138 is separately formed and then attached to the cylindrical sleeve 132. For example, and without limitation, the seal body 138 may be a stamped component, which then has the sealing member 140 attached, such that the secondary seal 136 may be press-fit onto the cylindrical sleeve 132 to complete the integrated sealing slinger 130. The cylindrical sleeve 132 and the dust shield 134 may still be formed as a one-piece, unitary body, as shown in FIG. 4.

The integrated sealing slinger 130 and the bearing 110 include a slinger pocket 142 formed on an exterior surface of the outer race 124. The slinger pocket 142 is a circumferential groove or channel. A slinger ledge 144 is formed on the dust shield 134. The slinger ledge 144 interfaces with the slinger pocket 142, and provides an additional barrier against the passage of debris into the bearing 110. The slinger ledge 144 interfaces by at least partially penetrating the grooved slinger pocket 142, and may have a complementary shape to the slinger pocket 142.

Figure 5:
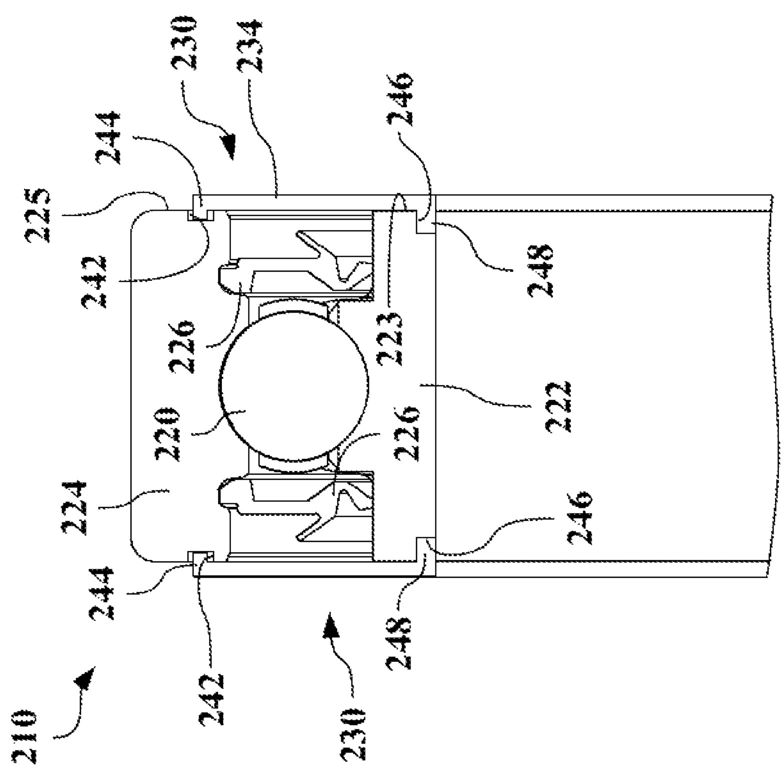
FIG. 5 is a schematic, cutaway view of another bearing configuration, taken along a line similar to the line 2-2 of FIG. 1.

Referring now to FIG. 5, and with continued reference to FIGS. 1-4, there is shown a schematic, cutaway view of a bearing 210, which may also be similar to the bearing 10 shown in FIG. 2. FIG. 5 is taken from a similar viewpoint to FIG. 2, and the bearing 210 may be used with the shaft 6 and housing 8 or similar components. Note that features shown in FIG. 5 may be used with features shown in FIGS. 1-4. Some features of the bearing 210 shown in FIG. 5 may not be separately numbered but correspond to features shown and discussed in relation to FIGS. 1-4.

One or more ball bearings 220 ride between an inner race 222, having an exterior surface 223, and an outer race 224, having an exterior surface 225. The outer race 224 is radially outward from, and distal to, the inner race 222 relative to an axis (not shown) of the bearing 210. A primary seal 226 is disposed between the inner race 222 and the outer race 224, and acts to restrict passage of dust, debris, and moisture from the exterior of the bearing 210 to the ball bearings 220.

A sealing slinger 230 is disposed on both sides of the bearing 210. A dust shield 234 of the sealing slinger 230 is substantially perpendicular to the bearing axis (not shown) and extends from the inner race 222 to the outer race 224.

As shown in FIG. 5, the bearing 210 may be configured with a slinger pocket 242 formed on the exterior surface 225 of the outer race 224. A slinger ledge 244 is formed on the dust shield 234 of the sealing slinger 230. The slinger ledge 244 interfaces with the slinger pocket 242. Therefore, the slinger ledge 244 and slinger pocket 242 provide additional protection against ingress of debris to the interior of the bearing 210.

The inner race 222 has an annular groove 246 formed on an exterior surface. The sealing slinger 230 has a lip portion 248, which is configured to mate with the annular groove 246. The lip portion 248 may be mated to the annular groove 246 by, for example and without limitation: press fitting, welding, or adhesively fastening the lip portion 248 into the annular groove 246. In the bearing 210, an inner surface of the sealing slinger 230 is substantially coincident with an inner surface of the inner race 222.

The detailed description and the drawings or figures are supportive and descriptive of the invention, but the scope of the invention is defined solely by the claims. While some of the best modes and other embodiments for carrying out the claimed invention have been described in detail, various alternative designs, configurations, and embodiments exist for practicing the invention defined in the appended claims.

The invention claimed is:

1. A bearing rotatable about a bearing axis and defining a center plane, comprising:
- an inner race having an outer surface distal from the bearing axis;
- an outer race distal from the inner race relative to the bearing axis;
- a cylindrical sleeve substantially coaxial with the bearing axis, wherein the cylindrical sleeve contacts the outer surface of the inner race;
- a dust shield substantially perpendicular to the cylindrical sleeve;
- a primary seal disposed proximal to the center plane from the dust shield, wherein the primary seal contacts the cylindrical sleeve and the outer race; and
- a secondary seal intermediate the primary seal and the dust shield, wherein the secondary seal includes:
  - a seal body extending radially outward from the cylindrical sleeve; and
  - a sealing member radially outward from the seal body and contacting an inner surface of the outer race.

2. The bearing of claim 1, wherein the dust shield is axially exterior to the outer race.

3. The bearing of claim 2, wherein the cylindrical sleeve and the dust shield are formed as a one-piece, unitary body.

4. The bearing of claim 3, wherein the outer race has an exterior surface, and further comprising:
- a slinger pocket formed on the exterior surface of the outer race; and
- a slinger ledge formed on the dust shield, wherein the slinger ledge interfaces with the slinger pocket.

5. The bearing of claim 3, wherein the seal body, the cylindrical sleeve, and the dust shield are formed as a one-piece, unitary body.

6. A bearing rotatable about an axis and defining a center plane, comprising:
- an inner race having an exterior surface distal from the center plane;
- an annular groove formed on the exterior surface of the inner race;

an outer race distal from the inner race relative to the axis, having an exterior surface and a slinger pocket formed on the exterior surface of the outer race; and a sealing slinger, having:

a lip portion configured to mate with the annular groove on the inner race;

a dust shield portion substantially perpendicular to the bearing axis and extending from the inner race to the outer race; and a slinger ledge formed on the dust shield portion of the sealing slinger, wherein the slinger ledge interfaces with the slinger pocket.

7. The bearing of claim 6, wherein the inner race has an inner surface proximal to the bearing axis, and wherein the sealing slinger has an inner surface proximal to the bearing axis, and the inner surface of the sealing slinger is substantially coincident with the inner surface of the inner race.

8. A propshaft bearing assembly for a vehicle, comprising:

a shaft rotatable about an axis;

a bearing rotatable about the axis and distal from the shaft, wherein the bearing defines a center plane and includes:

an inner race coaxial with the axis and in contact with the shaft, wherein the inner race defines an outer surface distal from the axis;

an outer race coaxial with the axis and distal from the inner race, wherein the outer race defines an exterior surface distal from the center plane;

a cylindrical sleeve substantially coaxial with the axis and contacting the outer surface of the inner race;

a dust shield substantially perpendicular to the cylindrical sleeve and extending distally from the cylindrical sleeve relative to the axis;

a slinger pocket formed on the exterior surface of the outer race; and a slinger ledge formed on the dust shield, wherein the slinger ledge interfaces with the slinger pocket; and a housing supporting the outer race of the bearing and fixedly attachable to the vehicle.

9. The propshaft bearing assembly of claim 8, wherein the bearing further includes:

a primary seal axially interior to the dust shield, wherein the primary seal contacts the cylindrical sleeve and the outer race.

10. The propshaft bearing assembly of claim 9, wherein the cylindrical sleeve and the dust shield of the bearing are formed as a one-piece, unitary body.

11. The propshaft bearing assembly of claim 10, wherein the bearing further includes a secondary seal intermediate the primary seal and the dust shield, and wherein the secondary seal includes:

a seal body extending distally from the cylindrical sleeve relative to the axis; and a sealing member disposed distally from the seal body, wherein the sealing member contacts the outer race.

* * * * *